(12) United States Patent
Bieber

(10) Patent No.: US 10,591,613 B2
(45) Date of Patent: Mar. 17, 2020

(54) METHOD AND DEVICE FOR DETERMINING A RELATIVE ALIGNMENT OF TWO GPS ANTENNAS IN RELATION TO ONE ANOTHER

(71) Applicant: KATHREIN-WERKE KG, Rosenheim (DE)

(72) Inventor: Robert Bieber, Rosenheim (DE)

(73) Assignee: KATHREIN-WERKE KG, Rosenheim (DE)

( * ) Notice: Subject to any disclaimer, the term of this patent is extended or adjusted under 35 U.S.C. 154(b) by 660 days.

(21) Appl. No.: 14/423,327

(22) PCT Filed: Jul. 11, 2013

(86) PCT No.: PCT/EP2013/002063
§ 371 (c)(1),
(2) Date: Feb. 23, 2015

(87) PCT Pub. No.: WO2014/029454
PCT Pub. Date: Feb. 27, 2014

(65) Prior Publication Data
US 2015/0226860 A1 Aug. 13, 2015

(30) Foreign Application Priority Data

Aug. 22, 2012 (DE) .................. 10 2012 016 637

(51) Int. Cl.
*G01S 19/54* (2010.01)
*G01S 3/46* (2006.01)

(52) U.S. Cl.
CPC ............... *G01S 19/54* (2013.01); *G01S 3/46* (2013.01)

(58) Field of Classification Search
CPC .......... G01S 19/51; G01S 19/53; G01S 19/54; G01S 3/4246; G01S 3/465; G01S 3/48; G01S 3/50; G01S 5/04; G01S 1/02
See application file for complete search history.

(56) References Cited

U.S. PATENT DOCUMENTS 3,068,474 A * 12/1962 Higgins ................... G01S 3/46
342/444
3,806,937 A 4/1974 Lindley
(Continued)

OTHER PUBLICATIONS

English translation of the Chinese Search Report dated Jun. 2, 2016, in corresponding Chinese Application No. 201380051025.8.
(Continued)

*Primary Examiner* — Bernarr E Gregory
*Assistant Examiner* — Daniel P Malley, Sr.
(74) *Attorney, Agent, or Firm* — Nixon & Vanderhye, P.C.

(57) ABSTRACT

Relative GPS antenna alignment uses a phase shifter electrically connected to a first GPS antenna. A combiner is electrically connected to the phase shifter, the second GPS antenna and to a GPS receiver. A GPS reception signal (Sig1) emitted by the first GPS antenna is phase-shifted by the phase shifter by a phase shift ($\varphi$) that can be set by way of a controller and is added by the combiner to a second GPS reception signal (Sig2) emitted by the second GPS antenna. The composite signal (Sum) thus produced is determined for at least three different phase shifts ($\varphi$). On the basis of these data, the profile of the composite signal (Sum) and the relative alignment of the two GPS antennas in relation to one another is determined.

25 Claims, 13 Drawing Sheets

(56) References Cited

U.S. PATENT DOCUMENTS

| | | | | |
|---|---|---|---|---|
| 5,373,236 A * | 12/1994 | Tsui | ................... | G01R 19/175 324/76.24 |
| 5,477,230 A * | 12/1995 | Tsui | ................... | G01S 7/021 342/156 |
| 5,943,008 A | 8/1999 | Van Dusseldorp | | |
| 6,014,109 A | 1/2000 | Raby | | |
| 6,018,315 A | 1/2000 | Ince et al. | | |
| 6,147,640 A * | 11/2000 | Wachs | ................... | G01S 3/46 342/352 |
| 6,441,779 B1 | 8/2002 | Bennett et al. | | |
| 6,469,663 B1 * | 10/2002 | Whitehead | ................... | G01S 19/44 342/357.31 |
| 8,184,050 B2 * | 5/2012 | Le Sage | ................... | G01S 19/53 342/359 |
| 2002/0167445 A1 * | 11/2002 | Eden | ................... | G01S 3/36 342/451 |
| 2006/0082501 A1 * | 4/2006 | Chiang | ................... | G01S 3/48 342/442 |
| 2008/0303711 A1 * | 12/2008 | Matsuoka | ................... | G01S 3/32 342/196 |
| 2009/0002165 A1 * | 1/2009 | Tuttle | ................... | G01S 3/48 340/572.1 |
| 2011/0090113 A1 * | 4/2011 | Fenton | ................... | G01S 19/54 342/357.36 |
| 2011/0291892 A1 * | 12/2011 | Lecca | ................... | G01S 3/14 342/420 |

OTHER PUBLICATIONS

English translation of the International Preliminary Report on Patentability and Written Opinion of the International Searching Authority dated Mar. 5, 2015, issued in International Application No. PCT/EP2013/002063.

International Search Report for PCT/EP2013/002063, dated Feb. 24, 2014, 4 pages.

Foreign-language ISR and Written Opinion for PCT/EP2013/002063, dated Feb. 24, 2014, 10 pages.

* cited by examiner

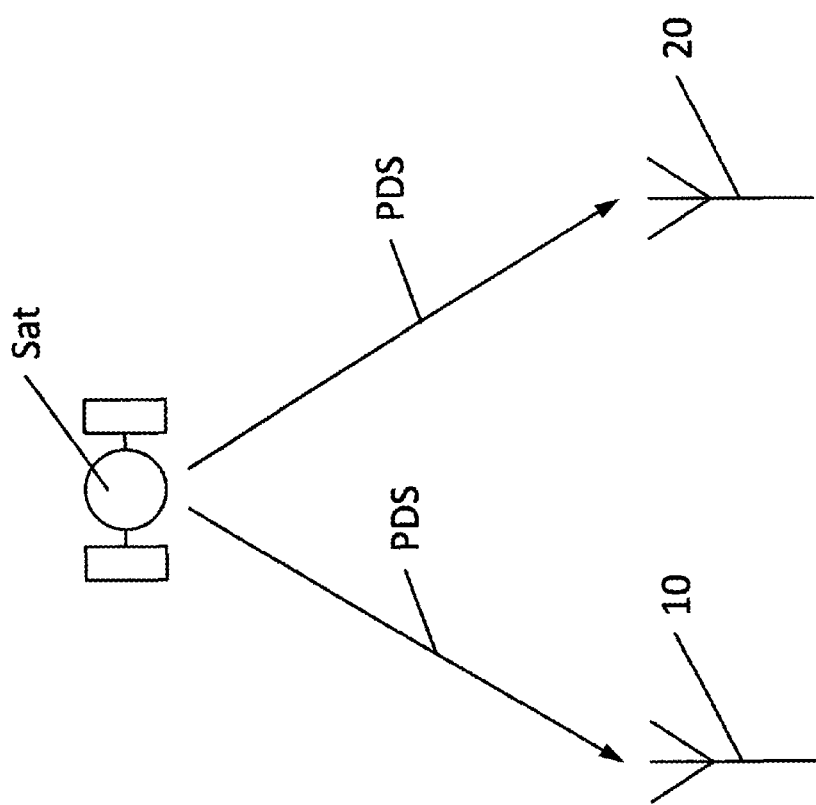

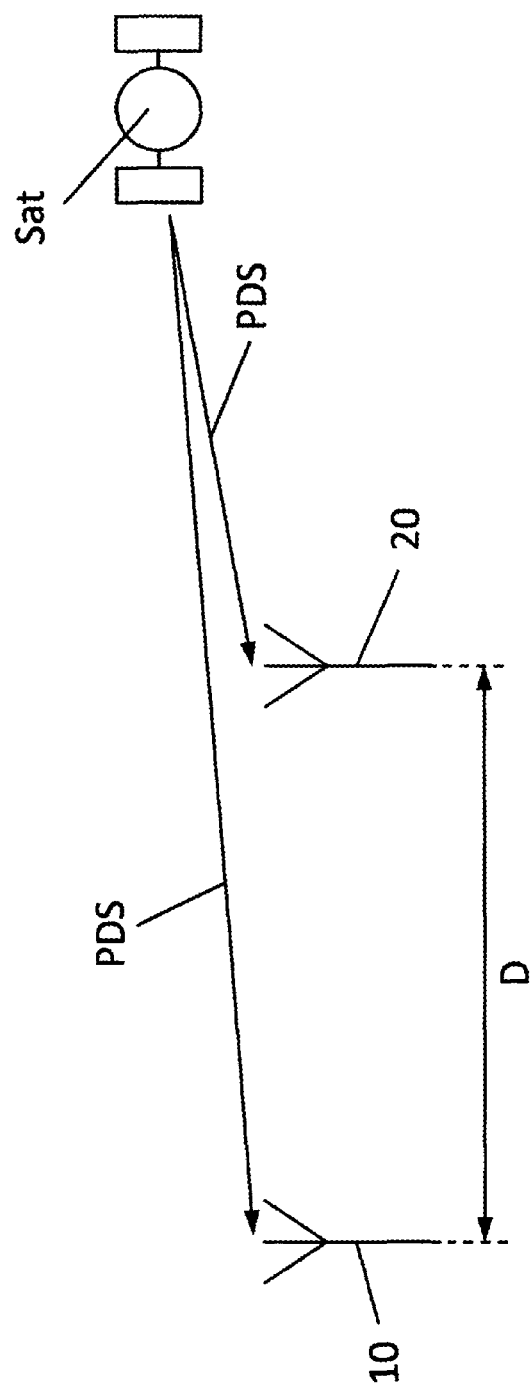

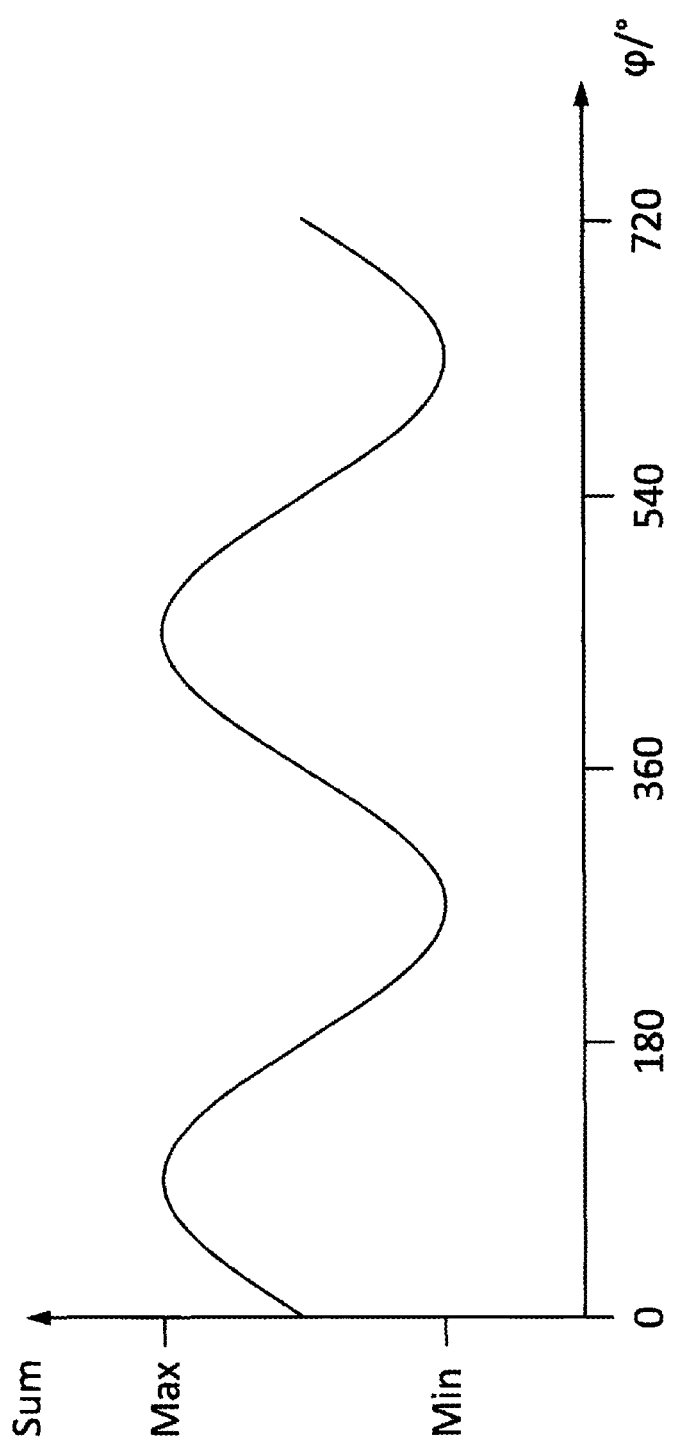

METHOD AND DEVICE FOR DETERMINING A RELATIVE ALIGNMENT OF TWO GPS ANTENNAS IN RELATION TO ONE ANOTHER

This application is the U.S. national phase of International Application No. PCT/EP2013/002063, filed Jul. 11, 2013, which designated the U.S. and claims priority to German Application No. 10 2012 016 637.0, filed Aug. 22, 2012, the entire contents of each of which are hereby incorporated by reference.

The present invention relates to a method and to a device for determining a relative alignment of two GPS antennas in relation to one another. By means of the method and by means of the device it is possible to determine for example the azimuth angle and/or the elevation angle of the two GPS antennas in relation to one another and thus of an object to which the two GPS antennas are fixed.

U.S. Pat. No. 5,943,008 discloses a device for determining an alignment of an antenna array. The antenna array comprises at least three receiving antennas for receiving GPS satellite signals, which have a fixed and known positioning in relation to one another. The receiving antennas are electrically connected to an individual GPS receiver via an interface. A first antenna for emitting a first GPS signal is directly connected to the interface, a first delay circuit being arranged between a second antenna for emitting a second GPS signal and the interface, and a second delay circuit being arranged between a third antenna for emitting a third GPS signal and the interface. The first delay circuit delays the transfer of the GPS satellite signal received by the second receiving antenna to the interface and to the GPS receiver by a first fixed delay time of for example 200 ns, and the second delay circuit delays the transfer of the GPS satellite signal received by the third receiving antenna to the interface and to the GPS receiver by a second fixed delay time of for example 400 ns. Among other things, the first and second delay circuits provide that the first, second and third GPS signals can be received separately by the GPS receiver, without interfering with one another. The GPS receiver has a processing functionality, in such a way that the GPS receiver determines alignment factors using the relative positions of the receiving antennas, the known first and second delay times and the known positional relationship of the receiving antennas in relation to one another. The GPS receiver determines the small differences between the predetermined delay times associated with the different receiving antennas and the measured code information and phase information of the received signals. These small differences are subsequently used to determine the difference between the positions of the three receiving antennas. As a result, the transit time differences in the GPS satellite signals in relation to the individual receiving antennas are used to determine the relative alignment of the receiving antennas in relation to one another.

To increase the precision of the determination of the alignment of the antenna array, more than three receiving antennas may be provided, a delay circuit having to be arranged in each case between each individual antenna and the interface and the GPS receiver. The respective delay circuits have to have different delays from one another so as to make it possible for the respective GPS signals to be received separately by the GPS receiver, since the GPS signals must not interfere with one another.

The object of the present invention is to provide a simple, cost-effective and improved device and an improved method for determining a relative alignment of two GPS antennas in relation to one another, by means of which the determination of the alignment of the two GPS antennas in relation to one another can be established to an increased precision.

According to the invention, the object is achieved by the method having the features specified in claim 1 and by the device having the features specified in claim 12. Advantageous configurations are specified in the dependent claims.

More specifically, the device according to the invention for determining a relative alignment of a first GPS antenna in relation to a second GPS antenna comprises the first GPS antenna, the second GPS antenna at a distance from the first GPS antenna, a phase shifter electrically connected to the first GPS antenna, an adding apparatus connected to the phase shifter and to the second GPS antenna, a GPS receiver electrically connected to the combination apparatus, and a control apparatus electrically connected to the GPS receiver and to the phase shifter. Upon receiving the at least one GPS satellite signal, the first GPS antenna emits a first GPS received signal and the second GPS antenna emits a second GPS received signal. The phase shifter is configured to shift a phase of the first GPS received signal by a phase shift, the phase shift being variable and being settable by means of the control apparatus. The phase shift may have any desired value, including zero. The respective phase shifts may be mutually equidistant or may be at different angular distances from one another. The combination apparatus, which may comprise an adding apparatus and is also known as a power combiner, is configured to combine the second GPS received signal with the first GPS signal which has been phase-shifted by the phase shift, so as to produce a combination signal which is supplied to the GPS receiver. The combination signal may preferably be the added signal of the second GPS received signal and the first GPS received signal which has been phase-shifted by the phase shift. The GPS receiver generates a sampling signal and/or a signal-to-noise-ratio signal from the combination signal, and transmits the sampling signal and/or the signal-to-noise-ratio signal to the control apparatus, which stores the sampling signal and/or the signal-to-noise-ratio signal together with the set phase shift. The device is configured to carry out these method steps, also known as repetition steps, for each of at least three different phase shifts, it alternatively being possible for the GPS satellite signal merely to be received once. The individual above-described components are electrically connected via signal lines.

The phase shifter may be implemented in any manner known in the art. In particular, the phase shifter may comprise different lengths of signal lines or delay lines, inductors and capacitors. The phase shifter may also be implemented as an all-pass. The phase shifter may also be implemented as a digital phase shifter.

Since the frequency of the combination signal and thus the frequency of the sampling signal and/or the frequency of the signal-to-noise-ratio signal and the differently set phase shifts are known, the device establishes the progression of the sampling signal and/or of the signal-to-noise-ratio signal by means of the control apparatus, on the basis of the at least three sampling signals and/or signal-to-noise-ratio signal thus obtained, which have in each case been obtained at different phase shifts. Since the relative positioning of the first GPS antenna and the second GPS antenna is known, the progression thus established of the sampling signal and/or of the signal-to-noise-ratio signal is characteristic of the alignment of the first GPS antenna in relation to the second GPS antenna, in such a way that the device can establish the relative alignment of the GPS antennas in relation to one another by means of the control apparatus on the basis of the progression of the sampling signal and/or the signal-to-noise-ratio signal.

By means of the device according to the invention, alignment of the two GPS antennas in relation to one another is possible to a high precision. As a result of the method according to the invention being used, the device according to the invention merely requires two GPS antennas to establish the alignment of the two GPS antennas in relation to one another to a high precision. A further advantage is that the device according to the invention merely requires one GPS receiver. The precision of the alignment determination can be increased by carrying out the repetition steps more than three times for respectively different phase shifts, in such a way that the progression of the combination signal and thus the progression of the sampling signal and/or of the signal-to-noise-ratio signal can be established more precisely. For a peak deviation of the phase shifter of for example 360°, the combination signal may be determined for example for 360 different phase shifts having angularly equidistant spacings of 1°. In this case, the progression of the combination signal is very precise as a result of the high number of measurement points.

Further, the precision of the alignment determination can be increased in that more than one GPS satellite signal is received by means of the first and the second GPS antennas. On the one hand, for this purpose the GPS satellite signal emitted by a GPS satellite can be received by the first and second GPS antennas at different moments, and on the other hand, the GPS satellite signals of a plurality of GPS satellites can be received by the first and second GPS antennas at one or more moments.

Thus, the method for determining a relative alignment of a first GPS antenna in relation to a second GPS antenna at a distance therefrom is preferably configured in such a way that the method comprises the following steps:
receiving at least one GPS satellite signal by means of the first GPS antenna, whilst emitting a number of first GPS received signals corresponding to the number of GPS satellite signals, and by means of the second GPS antenna, whilst emitting a number of second GPS received signals corresponding to the number of GPS satellite signals;
shifting a phase of the first GPS received signal(s) by a phase shift, by means of a phase shifter;
combining the second GPS received signal(s) with the corresponding first GPS received signal(s) which have been phase-shifted by the phase shift, to generate a number of combination signals corresponding to the number of GPS satellite signals, by means of a combination apparatus;
generating a number of sampling signals and/or signal-to-noise-ratio signals corresponding to the number of GPS satellite signals from the combination signal(s), by means of a GPS receiver;
storing the sampling signal(s) which are dependent on the phase shift and/or the signal-to-noise-ratio signal(s) which are dependent on the phase shift, by means of a control apparatus;
establishing the progression(s) of the sampling signal(s) which are dependent on the phase shift and/or of the signal-to-noise-ratio signal(s) which are dependent on the phase shift, by means of the control apparatus; and
establishing the relative alignment of the first GPS antenna in relation to the second GPS antenna on the basis of the progression(s) of the sampling signal(s) and/or the signal-to-noise-ratio signal(s), by means of the control apparatus.

As was already explained above, the first method step is carried out either once for one phase shift or at least three times for at least three different phase shifts. The second to fifth method steps are carried out for at least three different phase shifts. Subsequently, the sixth and seventh method steps can be carried out.

Preferably, establishing the progression of the combination signal and/or of the signal-to-noise-ratio signal comprises establishing at least one first phase shift, for which the combination signal and/or the signal-to-noise-ratio signal has a maximum, and/or at least one second phase shift, for which the combination signal and/or the signal-to-noise-ratio signal has a minimum. Further, establishing the relative alignment of the first GPS antenna in relation to the second GPS antenna is based at least on the first phase shift thus established, for which the combination signal and/or the signal-to-noise-ratio signal has a maximum, and/or on at least the second phase shift, for which the combination signal and/or the signal-to-noise-ratio signal has a minimum.

Since the frequency of the added signal and thus the frequency of the combination signal and/or of the signal-to-noise-ratio signal is known, the progressions thereof can be characterised in a simple manner by specifying a first or second phase shift for which the combination signal and/or the signal-to-noise-ratio signal has a maximum or a minimum. The frequency of the added signal is known, since the frequency of the carrier wave of the GPS satellite signal is known (for GPS signals the frequency of the carrier wave is for example 1.5 GHz). The phase shift for which the added signal has a maximum or minimum is characteristic of the relative positioning of a satellite which emits the GPS satellite signal in relation to the first GPS antenna and the second GPS antenna, in such a way that, on the basis of at least the first phase shift and/or at least the second phase shift, the alignment of the first GPS antenna in relation to the second GPS antenna can be established in a simple manner, since the relative positioning of the first GPS antenna in relation to the second GPS antenna is known.

Preferably, establishing the progression of the combination signal which is dependent on the phase shift and/or of the signal-to-noise-ratio signal comprises calculating the progression of the combination signal and/or of the signal-to-noise-ratio signal as a function of the phase shift.

Thus for example, on the basis of merely three data pairs each consisting of a phase shift and an amplitude of the combination signal and/or of the signal-to-noise-ratio signal, the progression of the combination signal and/or of the signal-to-noise-ratio signal can be calculated. This calculation can for example be carried out using what is known as a fit. If the progression of the combination signal and/or of the signal-to-noise-ratio signal is calculated in this manner, the position of a phase shift for which the combination signal and/or the signal-to-noise-ratio signal has a maximum or minimum can be determined in a simple manner, for example. On the basis of the known frequency of the combination signal and/or of the signal-to-noise-ratio signal, and on the basis of the calculated phase shift(s) for which the combination signal and/or the signal-to-noise-ratio signal has a maximum or minimum or a plurality of maxima or minima, the alignment of the first GPS antenna in relation to the second GPS antenna can be determined in this manner to a high precision, without the need for many measurements of the combination signal and/or of the signal-to-noise-ratio signal at many different phase shifts.

Preferably, calculating the progression of the combination signal which is dependent on the phase shift and/or of the signal-to-noise-ratio signal comprises calculating at least a first phase shift, for which the combination signal and/or the signal-to-noise-ratio signal has a maximum, and/or at least a second phase shift, for which the combination signal and/or the signal-to-noise-ratio signal has a minimum. This calculation of the progression can for example be carried out using what is known as a fit, for which merely three data pairs are needed, each consisting of a phase shift and of an associated amplitude of the combination signal and/or of the signal-to-noise-ratio signal. In this way, the phase shifts for which the combination signal and/or the signal-to-noise-ratio signal have a maximum or minimum can be determined precisely, without determining the progression of the combination signal and/or of the signal-to-noise-ratio signal by means of many different phase shifts. A corresponding determination of the progression of the combination signal and/or of the signal-to-noise-ratio signal is therefore possible very rapidly.

Preferably, the predetermined distance of the second GPS antenna from the first GPS antenna is less than or equal to a half-wavelength of the carrier wave of the GPS satellite signal.

If the distance between the two GPS antennas is less than or equal to the half-wavelength of the carrier wave of the GPS satellite signal, the result of establishing the relative alignment of the two GPS antennas in relation to one another merely has two uniqueness ranges. If the line connecting the two GPS antennas and the line connecting a GPS antenna to the GPS satellite are aligned mutually parallel, and thus form an angle of 0°, the path length difference of the GPS satellite signal in relation to the two GPS antennas is exactly equal to the distance between the two GPS antennas. The first received signal emitted by the first GPS antenna thus has a phase shift of 180° in relation to the second received signal emitted by the second GPS antenna, in such a way that adding the two received signals results in a minimum. If the line connecting the two GPS antennas and the line connecting a GPS antenna to the GPS satellite are not aligned mutually parallel, and form an angle of more than 0°, the path length difference of the GPS satellite signal in relation to the two GPS antennas is less than the distance between the two GPS antennas, in such a way that the first received signal emitted by the first GPS antenna has a phase shift of less than 180° in relation to the second received signal emitted by the second GPS antenna. In this case, the GPS satellite may be positioned either closer to the first GPS antenna or closer to the second GPS antenna. For a distance of less than half the carrier wavelength between the two GPS antennas, this results in precisely two uniqueness ranges, since according to the determination result the GPS satellite may be in two hemispheres. If the line connecting the two GPS antennas and the line connecting a GPS antenna to the GPS satellite are not aligned mutually parallel, and form an angle of 90°, the path length difference of the GPS satellite signal in relation to the two GPS antennas is exactly zero, in such a way that the first received signal emitted by the first GPS antenna has no phase shift in relation to the second received signal emitted by the second GPS antenna.

If the distance between the two GPS antennas is more than half the carrier wavelength, there are more than two uniqueness ranges for a determination result of the alignment of the GPS antennas in relation to one another, since in this case the path length difference of the GPS satellite signal in relation to the two GPS antennas is exactly half the carrier wavelength for an angle greater than 0° between the line connecting the two GPS antennas and the line connecting a GPS antenna to the GPS satellite. If the distance between the two GPS antennas is n times half the carrier wavelength for some positive integer n, the path difference in the GPS satellite signal for the two GPS antennas, for an angle φ formed by the line connecting the two GPS antennas and the line connecting a GPS antenna to the GPS satellite, is exactly half the carrier wavelength, or λ/2, if the angle φ meets the following condition:

$$\varphi = \arccos(1/n)$$

For n=2, φ=60°, and so the first uniqueness range is a cone of which the central axis is aligned perpendicular to the line connecting the two GPS antennas and of which the legs form an angle of 60° (=180°−2*60°). For n=3, φ=70.53°, and so the legs of the cone representing the first uniqueness range form an angle of 38.94° (=180°−2*70.53°).

By reducing the spacing of the two GPS antennas to at most half the carrier wavelength, the uniqueness ranges are thus reduced in such a way that the determination of the alignment of the GPS antennas in relation to one another is simplified.

In accordance with the method for determining a relative alignment of a first GPS antenna in relation to a second GPS antenna, it is also possible for more than one GPS satellite signal to be received by a plurality of GPS satellites, the additional data being used for increasing the precision of determination of the relative alignment of the GPS antennas in relation to one another. The additional data may further be used for a plausibility check, in which the plausibility of the determined alignment of the GPS antennas is analysed. If the evaluation of the GPS signals results in a plurality of possible alignments of the GPS antennas in relation to one another, the most plausible alignment can be determined.

The device preferably further comprises an attenuation apparatus, which is electrically connected to the second GPS antenna, the adding apparatus and the control apparatus. The attenuation apparatus is adapted to attenuate the second GPS received signal. The phase shifter downstream from the first GPS antenna can attenuate the GPS received signal. The amplitudes of the first GPS received signal and the second GPS received signal can be adapted to one another by means of the attenuation apparatus.

Further advantages, details and features of the invention may be taken from the following description of embodiments, in which:

FIG. 2a is a schematic drawing of a positioning of a GPS satellite in relation to a first and a second GPS antenna;

FIG. 2b is a schematic drawing of the progression of an added signal which is the result of adding a second GPS signal and a first GPS received signal which is phase-shifted by a phase shift, as a function of the phase shift for the positioning shown in FIG. 2a;

FIG. 3a is a schematic drawing of another positioning of a GPS satellite in relation to the first and the second GPS antenna;

FIG. 4b is a schematic drawing of the progression of an added signal, which is the result of adding the second GPS signal and the phase-shifted first GPS received signal, as a function of the phase shift for the positioning shown in FIG. 3a for a first distance between the two GPS antennas;

In the following description, like reference numerals denote like components or like features, in such a way that a description made for one component in reference to one drawing also applies to the other drawings, avoiding repetition of the description.

Figure 1:
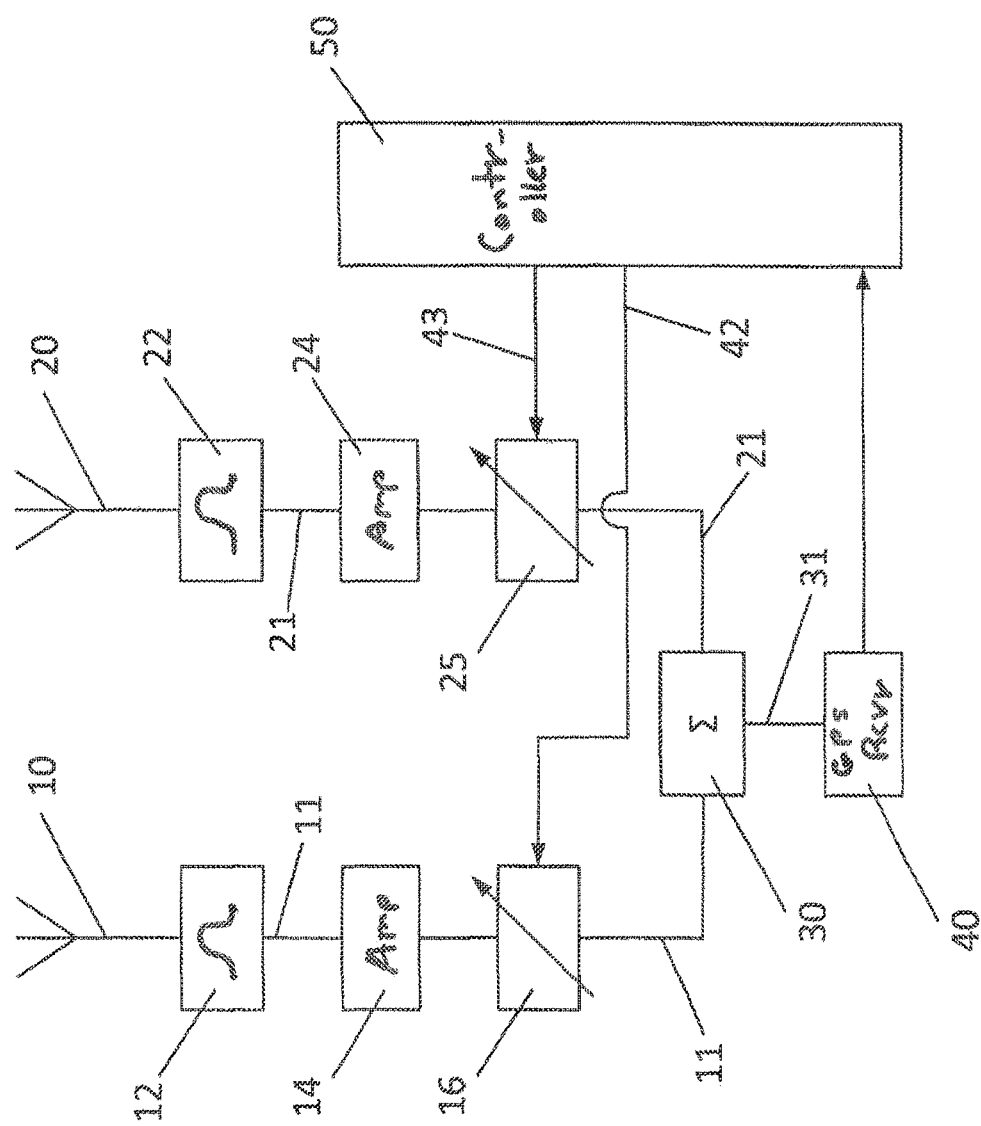
FIG. 1 is a schematic block diagram of the device according to the invention for determining a relative alignment of two GPS antennas in relation to one another.
Figure 3B:
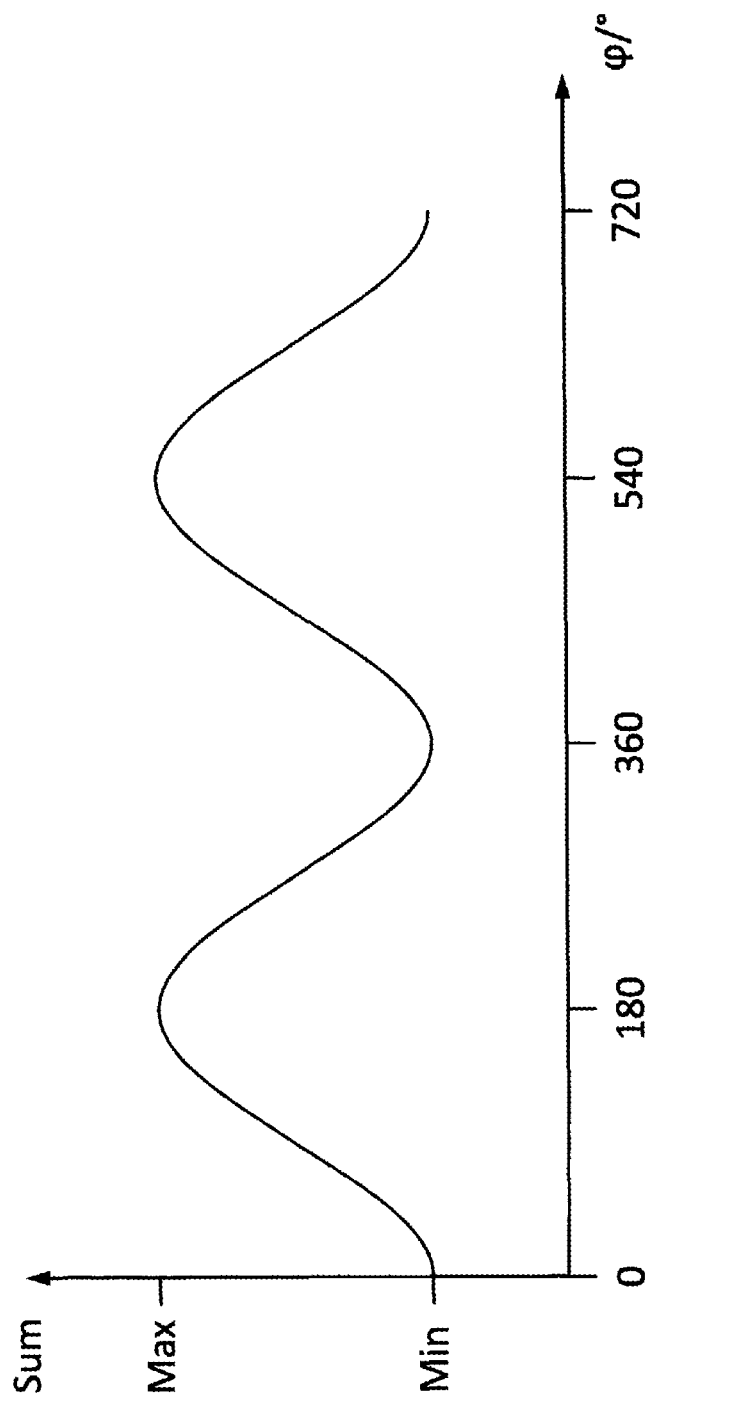
FIG. 3b is a schematic drawing of the progression of an added signal, which is the result of adding the second GPS signal and the phase-shifted first GPS received signal, as a function of the phase shift for the positioning shown in FIG. 3a for a first distance between the two GPS antennas.
Figure 4A:
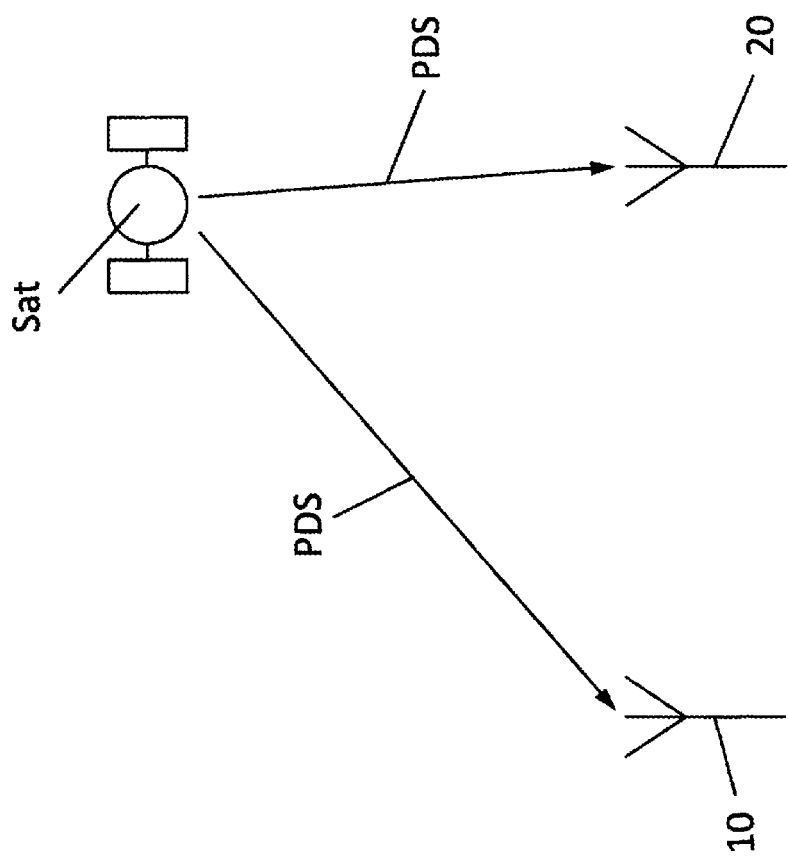
FIG. 4a is a schematic drawing of another further positioning of a GPS satellite in relation to the first and the second GPS antenna.

FIG. 1 is a schematic block diagram of the device according to the invention for determining a relative alignment of two GPS antennas 10, 20 in relation to one another. The device comprises a first GPS antenna 10 and a second GPS antenna 20 which are at a predetermined distance from one another. The first GPS antenna 10 is configured to emit a first GPS received signal Sig1 upon receiving a GPS satellite signal PDS emitted by a GPS satellite Sat (FIG. 2a, 3a, 4a). The GPS satellite signal PDS may in particular comprise a position data signal PDS. The first GPS antenna 10 is electrically connected to a band-pass filter 12, in such a way that merely the first GPS received signal Sig1 is passed on to an amplifier 14 connected to the band-pass filter 12. Usually, the frequency of the carrier wave of the GPS satellite signal is 1.5 GHz, in such a way that the passband of the band-pass filter is in a tight range around 1.5 GHz. The amplifier 14 amplifies the first GPS received signal Sig1 and transfers it to a phase shifter 16 electrically connected to the amplifier 14. The phase shifter 16 is electrically connected to a control apparatus 50, the phase shifter 16 obtaining control commands for setting a phase shift φ from the control apparatus 15.

The second GPS antenna 20 is electrically connected to a band-pass filter 22, which may be constructed identically to the band-pass filter 12. The band-pass filter 22 is in turn electrically connected to an amplifier 24, which is identical in construction to the amplifier 14. An attenuation apparatus 25 is electrically connected to the amplifier 24, and attenuates the second GPS received signal Sig2 emitted by the second GPS antenna 20. However, the attenuation apparatus 25 is not absolutely necessary for determining the alignment of the first GPS antenna 10 in relation to the second GPS antenna 20 using the device according to the invention.

The attenuation apparatus 25 is electrically connected to the control apparatus 50 and receives control signals for setting the variable attenuation therefrom. The attenuation apparatus 25 serves to adapt the amplitude of the second GPS signal Sig2 to the amplitude of the first GPS signal Sig1, since the first GPS signal Sig1 is also attenuated, in addition to the phase shift φ, by the phase shifter 16.

The device for determining the relative alignment of the two GPS antennas 10, 20 in relation to one another further comprises a combination apparatus 30, also known as a power combiner 30, which is implemented as an adding apparatus in the embodiment shown. Both the phase shifter 16 and the attenuation apparatus 25 are electrically connected to the adding apparatus 30. The adding apparatus 30 adds or combines the first GPS received signal Sig1, which is phase-shifted by the phase shift φ, and the second GPS received signal Sig2, which is attenuated by the attenuation apparatus 25. This addition takes into account the relative phase positions of the first GPS received signal Sig1 and the second GPS signal Sig2.

A GPS receiver 40 is electrically connected to the adding apparatus 30 and configured to receive an added signal Sum, which is generated by the adding apparatus 30 by adding the phase-shifted first GPS received signal Sig1 and the attenuated second GPS received signal Sig2. The GPS receiver 40 emits further data aside from the position, including a signal-to-noise-ratio signal SNR or a signal-to-noise-ratio of the GPS satellite signals PDS, as well as the azimuth and elevation of the respective received GPS satellite Sat. These data are all contained in a standard NMEA format. The GPS receiver 40 is electrically connected to the control apparatus 50 for emitting data to the control apparatus 50. The control apparatus 50 in turn comprises a processor and/or a memory or is connected to a memory (not shown). Therefore, the control apparatus has a control functionality, a processing functionality and/or a memory functionality. Therefore, by means of the control apparatus 50, data emitted by the GPS receiver 50 can be stored, the phase shift φ of the phase shifter 16 can be set, and the attenuation of the attenuation apparatus 25 can be set.

In the following, the dependency of the progression of the added signal Sum both on the position of a GPS satellite Sat in relation to the first GPS antenna 10 and the second GPS antenna 20 and on the phase shift φ, which is set by the phase shifter 16 and by which the first GPS received signal Sig1 is phase-shifted, is described with reference to FIGS. 2a to 4b. FIG. 2a shows a positioning of the GPS satellite Sat in which it is symmetrically arranged between the first GPS antenna 10 and the second GPS antenna 20. Therefore, the GPS satellite Sat is located at a point on a plane which extends between the first GPS antenna 10 and the second GPS antenna 20, in other words which intersects the connecting line between the first GPS antenna 10 and the second GPS antenna 20 in the centre thereof. Therefore, the distances of the GPS satellite Sat from the first GPS antenna 10 and from the second GPS antenna 20 are equal, in such a way that the distance to be covered by the GPS satellite signal PDS emitted by the GPS satellite Sat is of the same length for the first GPS antenna 10 as for the second GPS antenna 20. Therefore, the first GPs received signal Sig1 emitted by the first GPS antenna 10 and the second GPS received signal Sig2 emitted by the second GPS antenna 20 have identical phases.

Figure 2B:
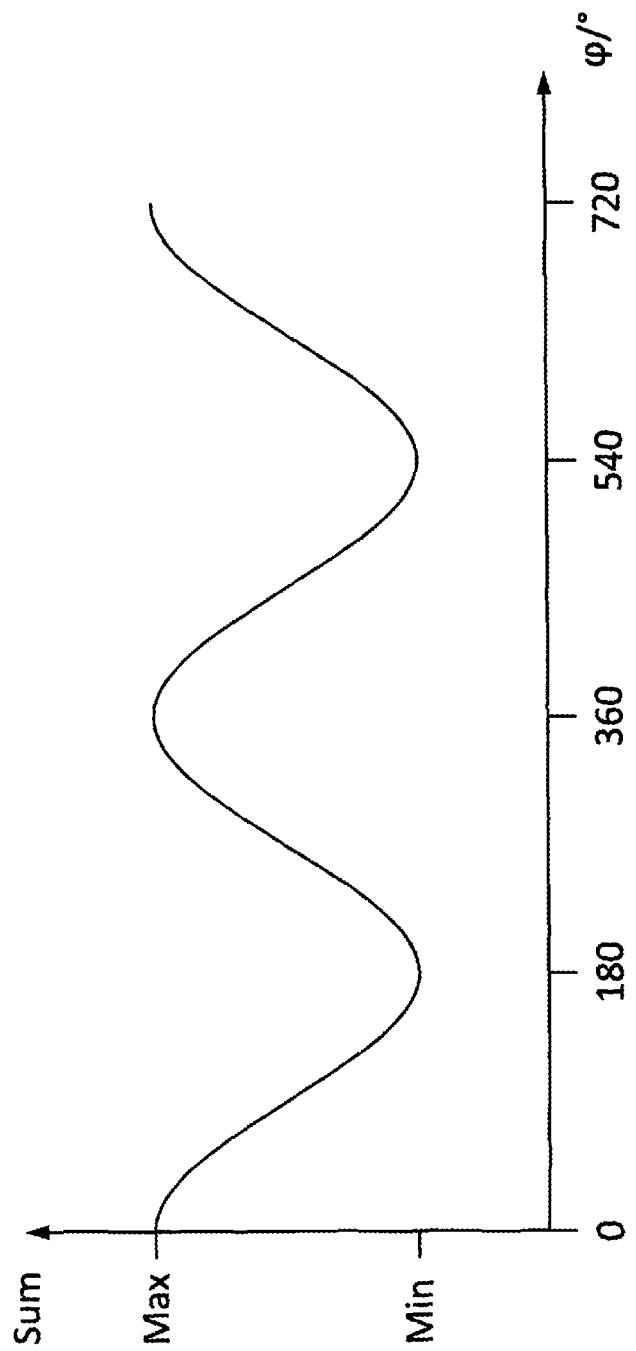

When the first GPS received signal Sig1 and the second GPS received signal Sig2 are added by the adding apparatus 30, the first GPS received signal Sig1 not having been phase-shifted by the phase shifter 16, the two GPS received signals Sig1, Sig2 are added with identical phases, in such a way that the added signal Sum thus generated has a maximum. By contrast, if the first GPS received signal Sig1 emitted by the first GPS antenna 10 is phase-shifted by means of the phase shifter 16, the first GPS received signal Sig1 and the second GPS received signal Sig2 cancel one another in part by interference, resulting in a minimum for the added signal Sum thus produced if the phase shift is an integer multiple of 180°. FIG. 2b shows the progression of the added signal Sum as a function of the phase shift φ by which the first GPS received signal Sig1 has been phase-shifted, for the positioning shown in FIG. 2a of the GPS satellite Sat in relation to the first GPS antenna 10 and the second GPS antenna 20.

FIG. 3a shows another positioning of the GPS satellite Sat with respect to the first and second GPS antennas 10, 20. The GPS satellite Sat is located at a point on a line approximately connecting the first GPS antenna 10 to the second GPS antenna 20. Therefore, the path to be covered by the GPS satellite signal PDS between the GPS satellite Sat and the first GPS antenna 10 is longer than the path to be covered by the GPS satellite signal PDS between the GPS satellite Sat and the second GPS antenna 20.

The distance between the first GPS antenna 10 and the second GPS antenna 20 is given as D in FIG. 3. Since the frequency of the carrier wave of the GPS satellite signal PDS is known and is usually 1.5 GHz, for a distance D of 0.1 m between the first GPS antenna 10 and the second GPS antenna 20, the first GPS received signal Sig1 emitted by the first GPS antenna 10 would be phase-shifted by 180° with respect to the second GPS received signal Sig2 emitted by the second GPS antenna 20, since in this case the distance D is exactly half the wavelength of the carrier wave, and so the transit time difference in the GPS satellite signal PDS from the GPS satellite Sat to the first GPS antenna 10 and to the second GPS antenna 20 leads to a phase shift φ of 180°. Thus, in general, for the first GPS received signal Sig1 to be phase-shifted by 180° with respect to the second GPS received signal Sig2, the following condition has to be met for the positioning shown in FIG. 3a:

$$D = n*c/2f$$

where n is an odd integer (1, 3, 5, 7, . . . ). If the first GPS received signal Sig1 is phase-shifted by 180° by means of the phase shifter 16, the added signal Sum has a maximum, since in this case the phases of the first GPS received signal Sig1 and the second GPS received signal Sig2 are equal again. FIG. 3b shows the progression of the added signal Sum as a function of the set phase shift φ for the positioning shown in FIG. 3a of the satellite Sat with respect to the first and second GPS antennas 10, 20, the relation shown above for the distance between the two GPS antennas 10, 20 being met in this case.

Figure 3C:
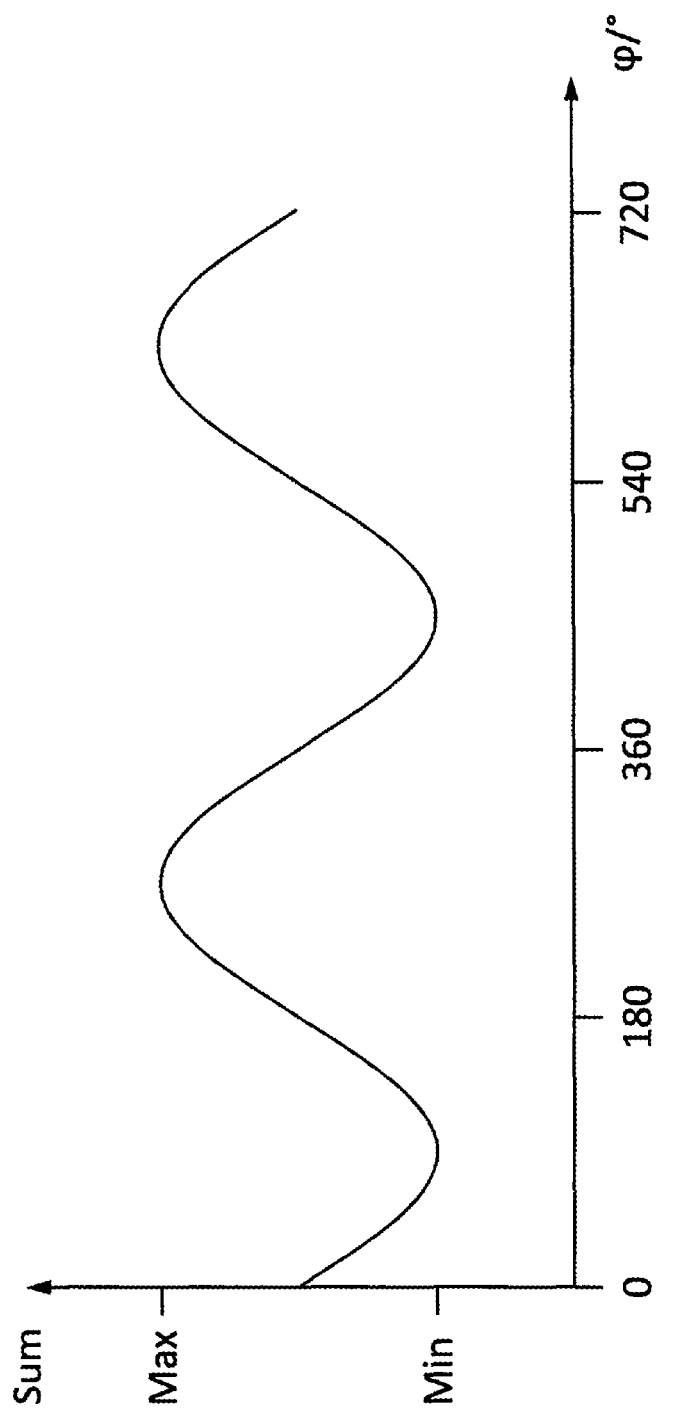
FIG. 3c is a schematic drawing of the progression of an added signal, which is the result of adding the second GPS signal and the phase-shifted first GPS received signal, as a function of the phase shift for the positioning shown in FIG. 3a for a second distance between the two GPS antennas.

By contrast, FIG. 3c shows the progression of the added signal Sum as a function of the phase shift φ for a case where the distance D between the first GPS antenna 10 and the second GPS antenna 20 does not meet the relation shown above.

In turn, FIG. 4a shows another further positioning of the GPS satellite Sat with respect to the first and second GPS antennas 10, 20, and FIG. 4b shows the progression of the added signal Sum as a function of the set phase shift φ for the positioning shown in FIG. 4a of the GPS satellite Sat.

The progression of the added signal Sum as a function of the phase shift φ is thus dependent on the different positioning of the GPS satellite Sat with respect to the first and second GPS antennas 10, 20, in such a way that the progression of the added signal Sum as a function of the phase shift φ for a known distance of the first GPS antenna 10 from the second GPS antenna 20 is characteristic of the position of the GPS satellite Sat. Therefore, from the progression of the added signal Sum together with the GPS satellite signal PDS transmitted by the GPS satellite Sat, a conclusion can be drawn as to the relative positioning of the first GPS antenna 10 in relation to the second GPS antenna 20.

Figure 5:
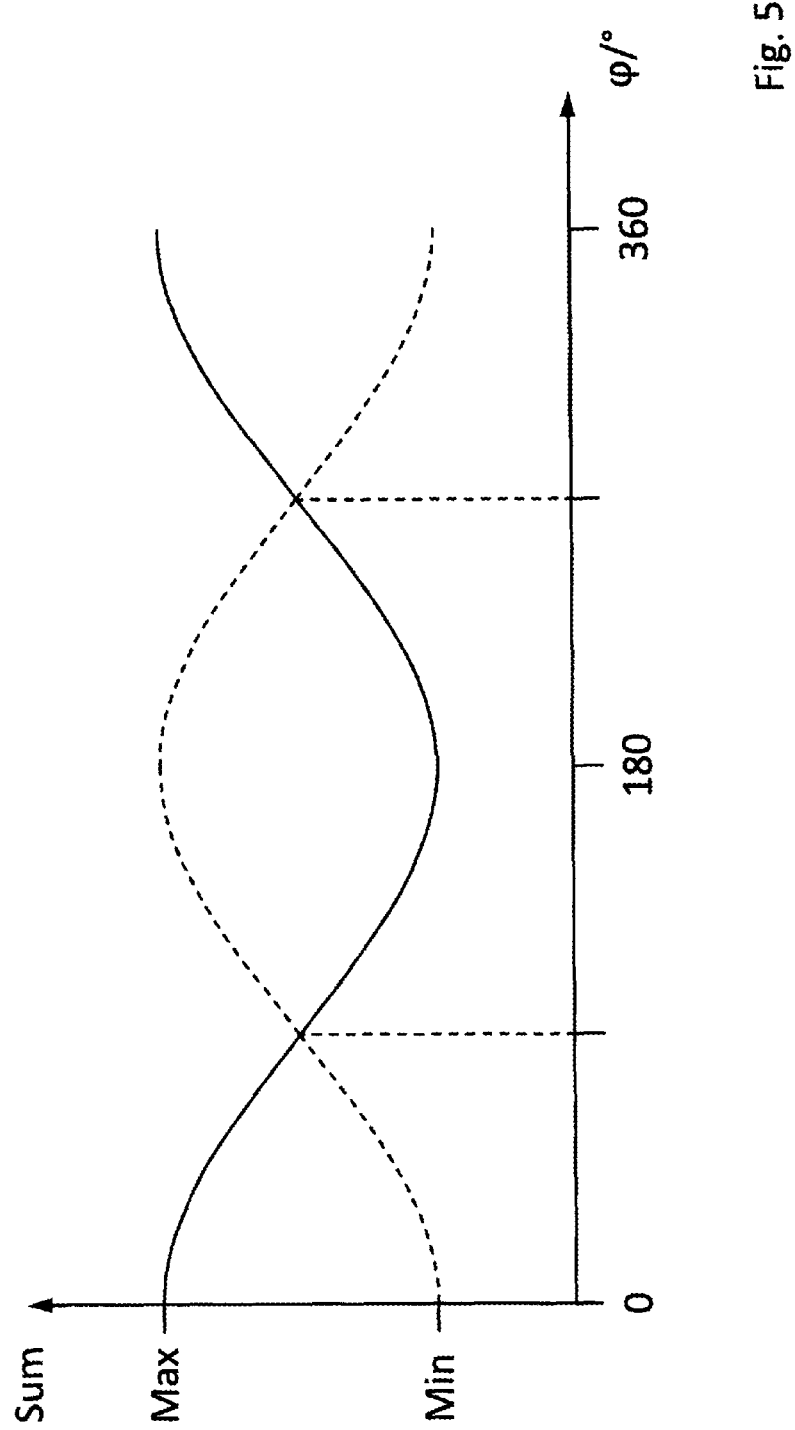
FIG. 5 is a schematic drawing of two added signals, which each originate from two different GPS satellite signals emitted from different GPS satellites.

FIG. 5 shows two added signals Sum, which are generated in the above-described manner. The two added signals shown differ in that the respective GPS received signals Sig1, Sig2 result from GPS satellite signals PDS emitted from GPS satellites Sat having different positionings with respect to the first and second GPS antennas 10, 20. It can be seen from FIG. 5 that the added signals Sum generated in this manner are identical for two phase shifts φ. As a result, at least three phase shifts φ have to be carried out by means of the phase shifter 16, and at the same time, the amplitudes of the associated added signals have to be determined so as to be able to establish the progression of the added signal Sum reliably and uniquely.

Figure 6:
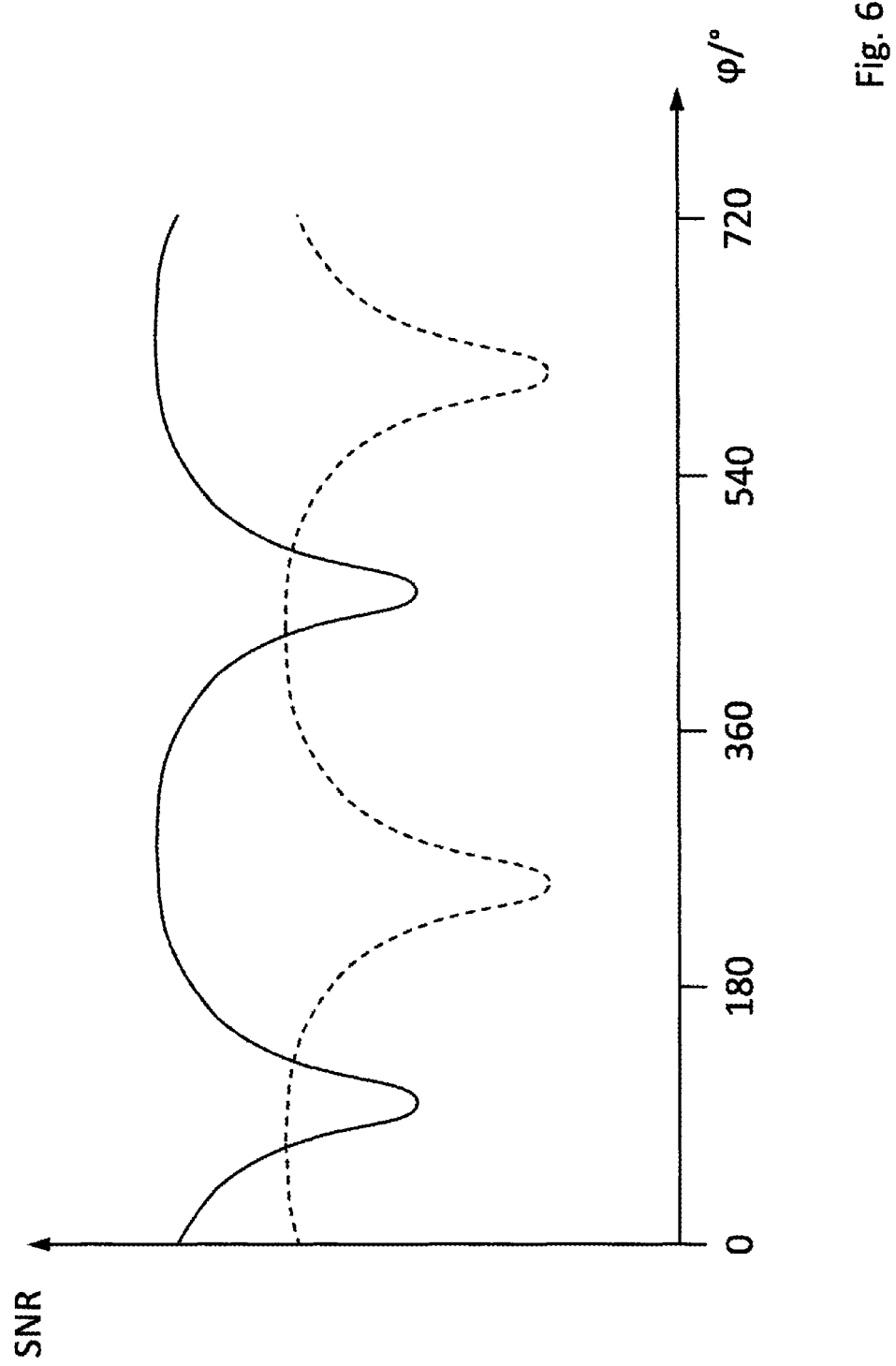
FIG. 6 is a schematic drawing of the progression of two signal-to-noise-ratios which are based on different GPS satellite signals which have been emitted by different GPS satellites.

FIG. 6 shows the dependence of two different signal-to-noise ratios SNR on a set phase shift φ. It can be seen from FIG. 6 that the maxima of the signal-to-noise ratios are more pronounced than the corresponding minima. This is due to the processing of the GPS received signals Sig1, Sig2 in the GPS receiver 40. It can be seen from FIG. 6 that the signal-to-noise ratio SNR has a characteristic progression which is dependent on the set phase shift φ, in such a way that the alignment of the first GPS antenna 10 in relation to the second GPS antenna 20 can also be determined as a function of the signal-to-noise ratio SNR.

Figure 7:
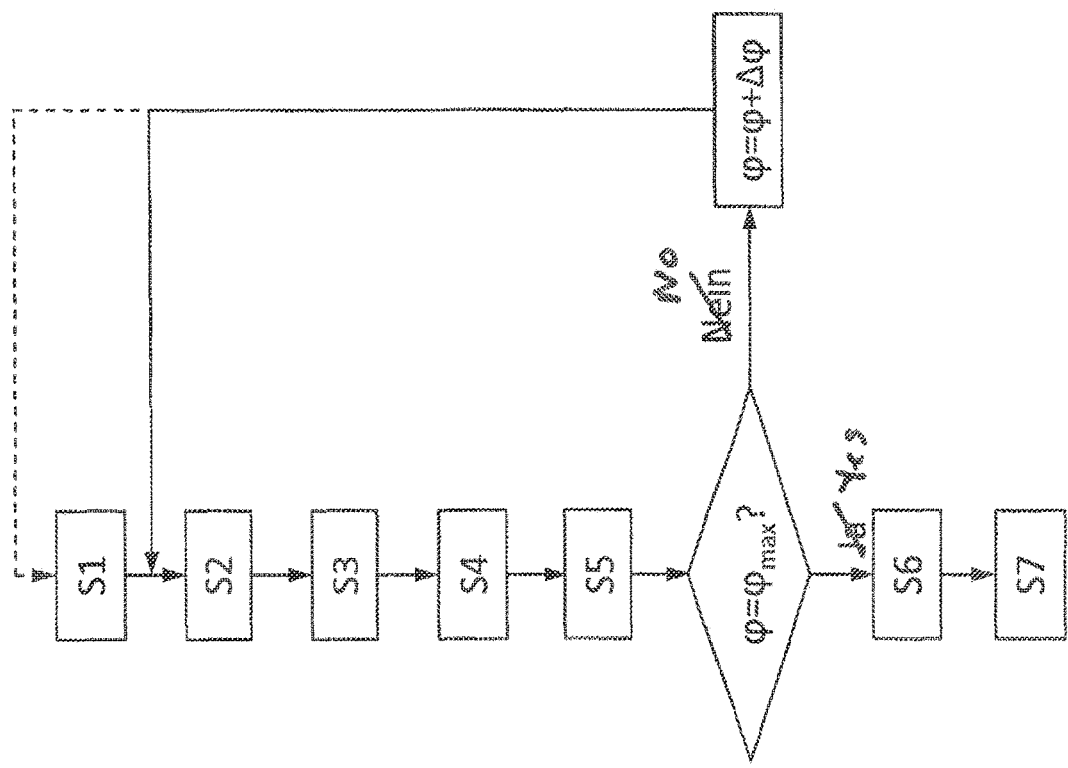
FIG. 7 is a flow chart of the method according to the invention.

FIG. 7 is a flow chart of the method according to the invention, which is carried out by the device according to the invention. In a first repetition step S1, a GPS satellite signal PDS is received by means of the first GPS antenna 10 and by means of the second GPS antenna 20. The first GPS antenna 10 emits the first GPS received signal Sig1, and the second GPS antenna 20 emits the second GPS received signal Sig2. The first repetition step S1 is followed by a second repetition step S2, in which the phase of the first GPS received signal Sig1 is shifted by a phase shift φ by means of the phase shifter 16. The phase shift φ is controlled by the phase shifter 16 by means of the control apparatus 50.

In a third repetition step S3, the second GPS received signal Sig2 is added to the first GPS received signal Sig1 which has been phase-shifted by the phase shift φ, to generate an added signal Sum. In a fourth repetition step S4, a sampling signal and/or the signal-to-noise-ratio signal SNR are generated from the added signal Sum. The sampling signal may for example comprise I data and Q data of the added signal Sum. In the following, merely the signal-to-noise-ratio signal SNR is discussed, but the following is also applicable to the sampling signal. Subsequently, in a firth repetition step S5, the signal-to-noise-ratio signal SNR is stored together with the information about the phase shift φ by means of the control apparatus 50.

These repetition steps are carried out at least for three different phase shifts φ. It can be seen from FIG. 7 that after the fifth repetition step S5 it is checked whether the set phase shift φ corresponds to a maximum phase shift φmax. If the set phase shift φ does not correspond to the maximum phase shift φmax, in other words is less than the maximum phase shift φmax, the set phase shift φ is increased by a phase increment Δφ, and there is a jump back either to the repetition step S1 or to the repetition step S2. As already mentioned above, these repetition steps are carried out at least three times, in such a way that for a peak deviation of for example 360° the phase increment in the case may be at most 120°.

Once at least three data pairs, each consisting of a signal-to-noise-ratio signal SNR and a phase shift φ associated with the signal-to-noise-ratio signal SNR, have been stored in this manner, in a method step S6 the progression of the signal-to-noise-ratio signal SNR, which is dependent on the phase shift φ, is determined by means of the control apparatus 50. This determination of the progression of the signal-to-noise-ratio signal SNR may for example take place in that, for a sufficiently precise measurement or sampling of the progression of the signal-to-noise-ratio signal SNR, the phase shift φ at which the signal-to-noise-ratio signal SNR has a maximum or minimum is determined in a look-up table. For example, the phase increment Δφ may merely be 1°, in such a way that for a peak deviation of 360° 360 signal-to-noise-ratio signals SNR are generated, in such a way that in the look-up table thus generated merely the phase shift φ at which the signal-to-noise-ratio signal SNR is a minimum or maximum has to be determined, it being possible to position the minimum or maximum of the signal-to-noise-ratio signal SNR very exactly for such a high-resolution measurement or sampling of the signal-to-noise-ratio signal SNR.

Alternatively or in addition, the method step S6 for determining the progression of the signal-to-noise-ratio signal SNR may comprise a method step for calculating the progression of the signal-to-noise-ratio signal SNR as a function of the phase shift φ. If for example the progression of the signal-to-noise-ratio signal SNR is merely determined as a function of three different phase shifts φ, it is possible to draw a conclusion as to the progression of the signal-to-noise-ratio signal SNR, or to calculate it, by means of what is known as a fit, on the basis that the frequency of the signal-to-noise-ratio signal SNR is known. Therefore, it is possible to precisely determine minima and maxima of the signal-to-noise-ratio signal SNR even if merely a few phase shifts φ are carried out.

In a further method step S7, the relative alignment of the first GPS antenna 10 in relation to the second GPS antenna 20 is determined on the basis of the progression of the signal-to-noise-ratio signal SNR by means of the control apparatus 50.

Figure 8:
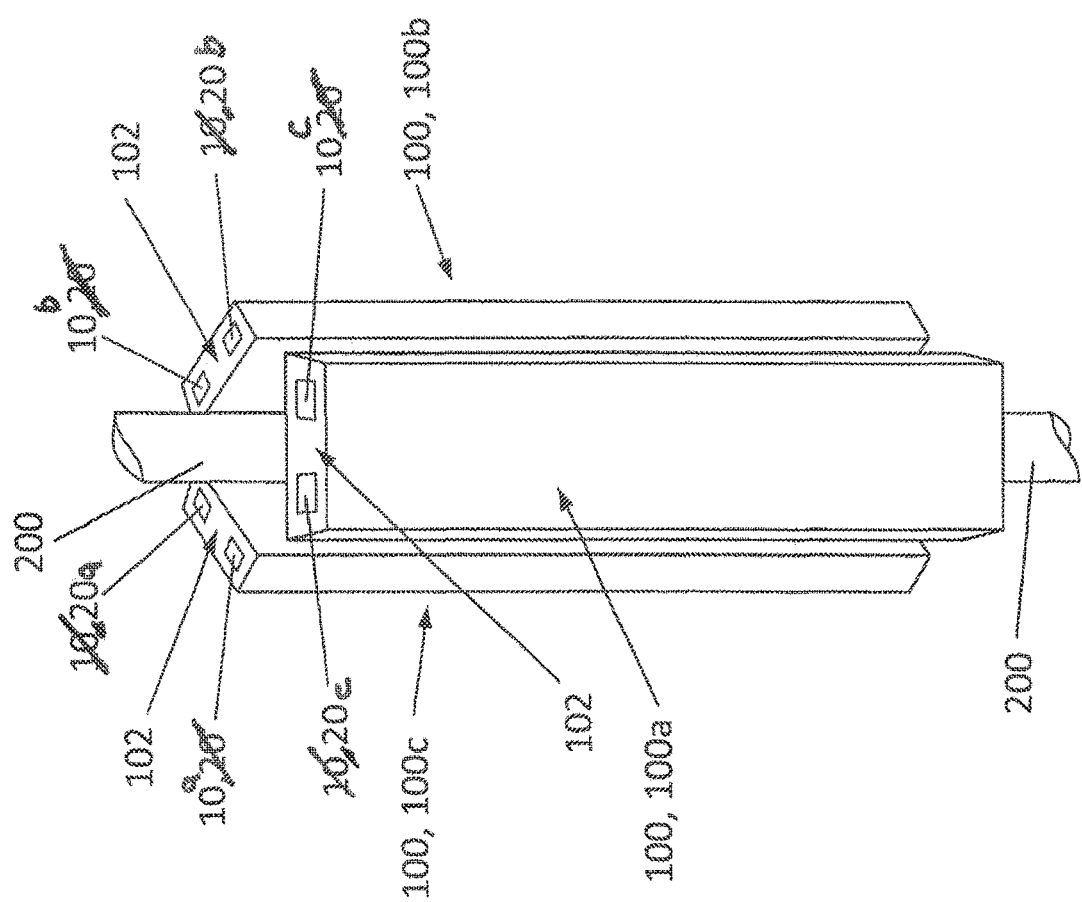
FIG. 8 is a schematic three-dimensional drawing of three antenna arrangements which are arranged around a mast to produce three different emission angles, each antenna arrangement comprising a device according to the invention for determining a relative alignment of two GPS antennas in relation to one another.
Figure 9:
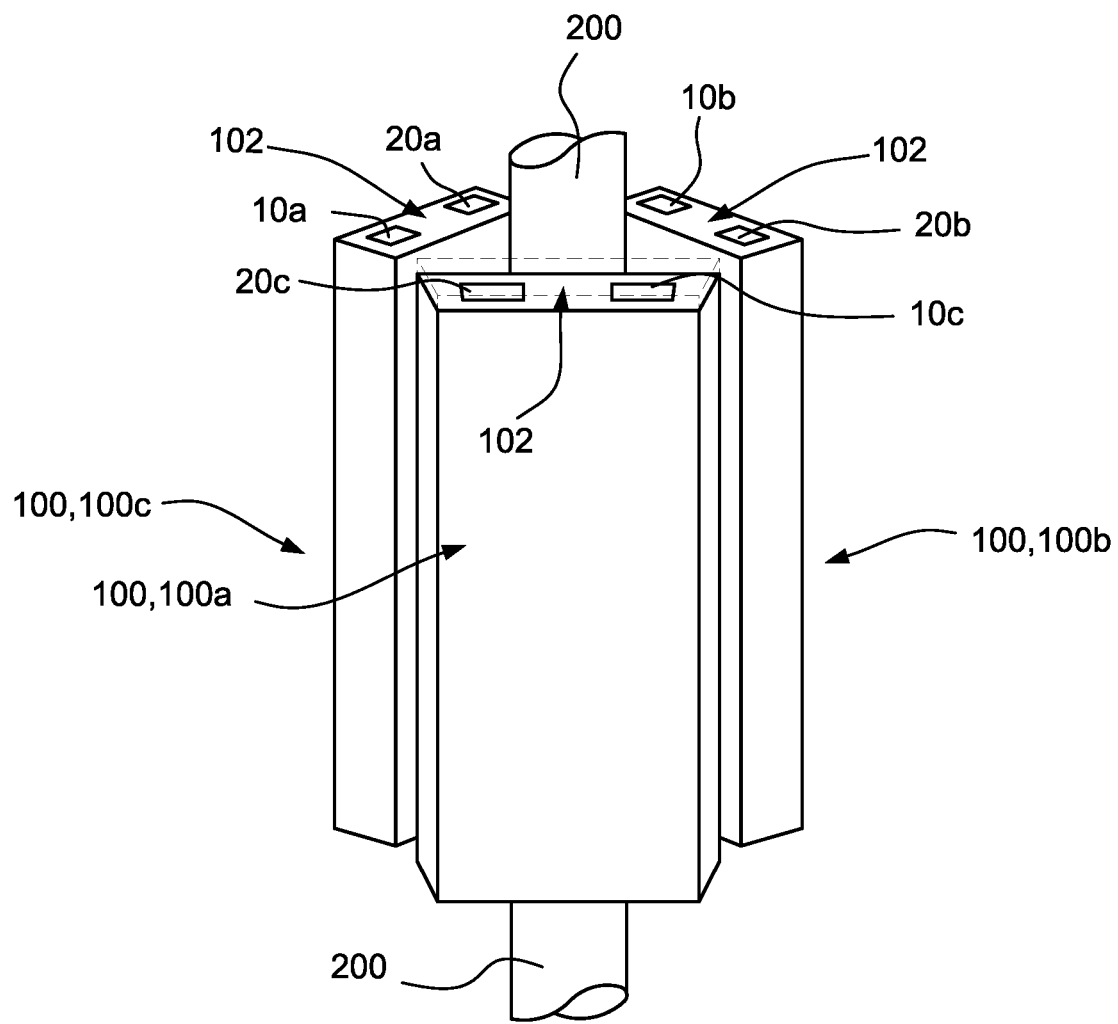
FIG. 9 shows an embodiment in which the first GPS antenna (10) is at a vertical distance from the second GPS antenna (20).

FIG. 8 shows an example application of the device according to the invention for determining a relative alignment of a first GPS antenna 10 in relation to a second GPS antenna 20. FIG. 8 shows a holding and carrying device 200, for example in the form of a mast 200, on which three antennas or single antennas 100a, 100b, 100c are held positioned offset in the circumferential direction, which consist for example of three single-gap or multi-gap antenna arrays, which usually comprise a substantially vertically aligned reflector and radiator apparatuses arranged in front thereof. These may be single-polarised or dual-polarised radiator apparatuses for transmitting in one frequency band or for two-frequency or multi-frequency bands, if for example this is a dual-band or multi-band antenna arrangement. In the embodiment shown, the individual antenna apparatuses 100a, 100b, 100c are each enclosed by a radome as a protector.

By suitable mechanical or controllable measures, the antennas 100a, 100b, 100c, which are in principle positioned mutually offset for example at a 120° angle, may also be offset at an angle deviating at least slightly therefrom, for example so as to illuminate the different three sectors.

In the embodiment shown, two GPS antennas 10, 20 having a lateral offset are provided in each case on the upper end face 102 or above the end face region 102. The antenna arrangement further comprises the further components according to the invention which were shown or described in the description with reference to FIG. 1. By means of the above-described method, it is possible to align the first GPS antenna 10 in relation to the second GPS antenna 20 and thus to align the individual antennas 100a, 100b, 100c.

Thus, the alignment of an antenna arrangement or of individual antennas 100a, 100b, 100c which are each equipped with a device according to the invention can be exactly determined.

LIST OF REFERENCE SIGNS 10 first GPS antenna
11 signal line
12 band-pass filter
14 amplifier
16 phase shifter
20 second GPS antenna
21 signal line
22 band-pass filter
24 amplifier
25 attenuation apparatus
30 combination apparatus, adding apparatus, power combiner
31 signal line
40 GPS receiver
41, 42, 43 signal line
50 control apparatus
100, 100a, 100b, 100c object, antenna, individual antenna
102 end face region
200 holding and carrying device/mast
φ phase shift
φ1 first phase shift, for which the added signal has a maximum
φ2 second phase shift, for which the added signal has a minimum
φmax maximum phase shift
Δφ phase shift increment
D distance between first GPS antenna and second GPS antenna
n number of times repetition steps are carried out
PDS GPS satellite signal
S1-S6 method steps
Sat GPS satellite
Sig1 first GPS received signal
Sig2 second GPS received signal
Sum added signal

The invention claimed is:

1. Method for determining alignment between first and second GPS antennas arranged at a distance from one another, comprising:
    (a) the first GPS antenna receiving at least one GPS satellite signal from a satellite emitting a first GPS received signal, and the second GPS antenna receiving the at least one GPS satellite signal from the satellite emitting a second GPS received signal;
    performing for at least three different phase shifts (φ):
    (b) shifting, using a phase shifter, a phase of the first GPS received signal by a phase shift (φ);
    (c) combining the second GPS received signal with the first GPS received signal which has been phase-shifted by the phase shift (φ), to generate a combination signal;

(d) using a GPS receiver, generating a sampling signal and/or signal-to-noise-ratio signal from the combination signal, the sampling signal and/or signal-to-noise ratio signal being dependent on the phase shift (φ); and (e) storing the sampling signal which is dependent on the phase shift (φ) and/or the signal-to-noise-ratio signal which is dependent on the phase shift (φ), wherein (b)-(e) are carried out a number (n) of times corresponding to a quotient of a maximum phase shift (φmax) and a phase shift increment (Δφ) for phase shifts (φ) which are integer multiples of the phase shift increment (Δφ), wherein the maximum phase shift (φmax) is at least 360° and the phase shift increment (Δφ) is at most 120°; then performing:

(f) establishing a progression of the sampling signal which is dependent on the phase shift (φ) and/or of the signal-to-noise-ratio signal which is dependent on the Phase shift (φ), the progression being characteristic of the relative positioning of the satellite in relation to the first GPS antenna and the second GPS antenna; and (g) determining relative alignment of the first GPS antenna in relation to the second GPS antenna on a basis of the progression of the sampling signal and/or the signal-to-noise-ratio signal.

2. Method according to claim 1, wherein:
establishing the progression of the sampling signal and/or of the signal-to-noise-ratio signal comprises establishing at least one first phase shift (φ1), for which the sampling signal and/or the signal-to-noise-ratio signal has a maximum, and/or at least one second phase shift (φ2), for which the sampling signal and/or the signal-to-noise-ratio signal has a minimum; and
the method further includes establishing the relative alignment of the first GPS antenna in relation to the second GPS antenna based on at least the first phase first shift (φ1) and/or on at least the second phase shift (φ2).

3. Method according to claim 1, wherein establishing the progression of the sampling signal and/or signal-to-noise-ratio signal which is dependent on the phase shift (φ) comprises calculating the progression of the sampling signal and/or signal-to-noise-ratio signal as a function of the phase shift (φ).

4. Method according to claim 3, wherein calculating the progression of the sampling signal and/or signal-to-noise-ratio signal which is dependent on the phase shift (φ) comprises calculating at least one first phase shift (φ1), for which the sampling signal and/or the signal-to-noise-ratio signal has a maximum, and/or at least one second phase shift (φ2), for which the sampling signal and/or the signal-to-noise-ratio signal has a minimum.

5. Method according to claim 1, wherein the at least three different phase shifts (φ) for which the repetition steps are carried out are angularly equidistant from one another.

6. Method according to claim 1, further comprising performing the following:
determining whether the phase shift (φ) corresponds to the maximum phase shift (φmax);
increasing the phase shift (φ) by the phase shift increment (Δφ) if the phase shift (φ) does not correspond to the maximum phase shift (φmax); and
changing the phase shift (φ) of the phase shifter.

7. Method according to claim 1, wherein the alignment comprises an azimuth angle and/or an elevation angle.

8. Method according to claim 1, further comprising attenuating the second GPS received signal.

9. Device for determining a relative alignment of a first GPS antenna in relation to a second GPS antenna each for receiving a GPS satellite signal from a satellite, the second GPS antenna being at the distance from the first GPS antenna, the device comprising:
a phase shifter which is connected at least indirectly to the first GPS antenna by a first signal line;
a combiner, which is connected at least indirectly to the phase shifter by the first signal line and to the second GPS antenna by a second signal line;
a GPS receiver which is electrically connected to the combiner by a third signal line; and
a controller which is connected at least indirectly to the GPS receiver via a fourth signal line and at least indirectly to the phase shifter via a fifth signal line,
wherein the controller carries out a number (n) of measurements using the phase shifter, the combiner and the GPS receiver, the number (n) corresponding to a quotient of a maximum phase shift (φmax) and a phase shift increment (Δφ) for phase shifts (φ) which are integer multiples of the phase shift increment (Δφ), wherein the measurements measure amplitude patterns relative to phase shift that are characteristic of the relative positioning of the satellite in relation to the first GPS antenna and the second GPS antenna, and the maximum phase shift (φmax) is at least 360° and the phase shift increment (Δφ) is at most 120°.

10. Device according to claim 9, wherein the first GPS antenna is at a predetermined distance (D) from the second GPS antenna.

11. Device according to claim 10, wherein the predetermined distance (D) of the second GPS antenna from the first GPS antenna is less than or equal to a half-wavelength of the carrier wave of the GPS satellite signal (PDS).

12. Device according to claim 9 for determining a relative alignment of the first GPS antenna to the second GPS antenna, wherein the device further comprises an attenuator, which is arranged between the second GPS antenna and the combiner and which is at least indirectly connected to the second GPS antenna and the combiner via the signal line and at least indirectly connected to the controller via a further signal line.

13. Device according to claim 9, wherein the first GPS antenna is horizontally spaced from the second GPS antenna.

14. Device according to claim 9, wherein the first GPS antenna is vertically spaced from the second GPS antenna.

15. Device according to claim 9, further comprising a third GPS antenna, which is at a distance orientated perpendicular to a line connecting the first GPS antenna and the second GPS antenna.

16. An antenna structure, comprising:
at least one antenna;
the device according to claim 9 for determining the alignment of the antenna,
wherein the device is connected to or integrated into the antenna.

17. Device according to claim 9 wherein the device is configured and structured to repetitively perform for each of three phases:
the first GPS antenna receiving the GPS satellite signal while emitting a first GPS received signal, and the second GPS antenna receiving the GPS satellite signal while emitting a second GPS received signal;
the phase shifter shifting a phase of the first GPS received signal by a phase shift (φ);

the combiner combining the second GPS received signal with the first GPS received signal which has been phase-shifted by the phase shift ($\varphi$), to generate a combination signal;

the GPS receiver generating a sampling signal and/or signal-to-noise-ratio signal from the combination signal; and the controller storing the sampling signal which is dependent on the phase shift ($\varphi$) and/or the signal-to-noise-ratio signal which is dependent on the phase shift ($\varphi$); and configured to perform the following after repetitively performing the above:

the controller establishing the progression of the sampling signal which is dependent on the phase shift ($\varphi$) and/or of the signal-to-noise-ratio signal which is dependent on the phase shift ($\varphi$); and the controller establishing relative alignment of the first GPS antenna in relation to the second GPS antenna on the basis of the progression of the sampling signal and/or the signal-to-noise-ratio signal.

18. Device according to claim 9, wherein the device is designed and configured such that the first and the second GPS antennas can receive a plurality of GPS satellite signals, such that either the GPS satellite signals are emitted by a GPS satellite at different moments, or the first and second GPS antennas can receive the GPS satellite signals from a plurality of GPS satellites at one or more moments.

19. Device according to claim 9, wherein the device is configured to perform a plausibility check to check plausibility of a determined alignment of the GPS antennas.

20. Device according to claim 9, wherein the device is constructed such that, in order to determine the alignment of two GPS antennas, the first GPS antenna receives a plurality of GPS satellite signals, while emitting a first GPS received signal, and the second GPS antenna receives the plurality of GPS satellite signals, while emitting a second GPS received signal, and the repetition steps (b) to (e) are carried out for at least three different phase shifts ($\varphi$) for each of the received GPS satellite signals.

21. Method according to claim 1, wherein (b)-(e) are performed for at least three different phase shifts, and (f) and (g) are performed after performing (b)-(e) for the at least three different phase shifts.

22. Method according to claim 1, wherein a plurality of GPS satellite signals are received by the first and the second GPS antennas for which purpose either the GPS satellite signals are emitted by a GPS satellite at different moments, or the GPS satellite signals from a plurality of GPS satellites at one or more moments are received by the first and second GPS antennas.

23. Method according to claim 1, further including performing a plausibility check to check the plausibility of a determined alignment of the first and second GPS antennas.

24. Method according to claim 1, wherein, in order to determine the alignment of the first and second GPS antennas, a plurality of GPS satellite signals are received by the first GPS antenna, while emitting a first GPS received signal, and by the second GPS antenna, while emitting a second GPS received signal, and (b) to (e) are carried out for at least three different phase shifts ($\varphi$) for each of the received GPS satellite signals.

25. System for determining relative antenna alignment comprising:

a first GPS antenna receiving at least one GPS satellite signal from a satellite and providing a first GPS received signal, a second GPS antenna receiving the at least one GPS satellite signal from the satellite and providing a second GPS received signal;

a phase shifting circuit operatively coupled to receive at least one of the provided first and second GPS received signals; and a controller configured to control the phase shifting circuit to perform for at least three different phase shifts ($\varphi$) including:

(a) shifting a phase of the first GPS received signal by a phase shift ($\varphi$);

(b) combining the second GPS received signal with the first GPS received signal which has been phase-shifted by the phase shift ($\varphi$), to generate a combination signal;

(c) generating a sampling signal and/or signal-to-noise-ratio signal from the combination signal;

(d) storing the sampling signal which is dependent on the phase shift ($\varphi$) and/or the signal-to-noise-ratio signal which is dependent on the phase shift ($\varphi$), carrying out operations (a)-(d) a number (n) of times corresponding to a quotient of a maximum phase shift ($\varphi$max) and a phase shift increment ($\Delta\varphi$) for phase shifts ($\varphi$) which are integer multiples of the phase shift increment ($\Delta\varphi$), wherein the maximum phase shift ($\varphi$max) is at least 360° and the phase shift increment ($\Delta\varphi$) is at most 120°; the controller being further configured to perform:

(e) establishing a progression of the sampling signal which is dependent on the phase shift ($\varphi$) and/or of the signal-to-noise-ratio signal which is dependent on the phase shift ($\varphi$), the progression being characteristic of the relative positioning of the satellite in relation to the first GPS antenna and the second GPS antenna; and (f) determining alignment between the first GPS antenna and the second GPS antenna on a basis of the progression of the sampling signal and/or the signal-to-noise-ratio signal.

* * * * *